United States Patent [19]

Hornibrook et al.

[11] 4,248,762
[45] Feb. 3, 1981

[54] PRESSURE SENSITIVE PRODUCTS WITH DECORATIVE APPEARANCE

[75] Inventors: Walter J. Hornibrook, Newburgh; Ronald A. Lombardi, New Windsor, both of N.Y.

[73] Assignee: Stauffer Chemical Company, Westport, Conn.

[21] Appl. No.: 893,926

[22] Filed: Apr. 5, 1978

Related U.S. Application Data

[62] Division of Ser. No. 816,236, Jul. 18, 1977.

[51] Int. Cl.³ .................................................. C08K 3/08
[52] U.S. Cl. .............................. 260/42.22; 427/208.4; 428/328; 428/356
[58] Field of Search ............... 428/40, 328, 335, 336, 428/337, 906, 317, 355, 356, 323; 156/327, 332; 427/207 B, 208.4; 252/512, 511; 260/37, 42.52, 42.22, 37 M

[56] References Cited

U.S. PATENT DOCUMENTS

| | | | |
|---|---|---|---|
| 2,575,265 | 11/1951 | Fiedler et al. | 260/42.22 |
| 2,858,230 | 10/1958 | Knoll et al. | 260/42.22 |
| 3,075,853 | 1/1963 | Striker et al. | 428/352 |
| 3,234,038 | 2/1966 | Stephens et al. | 428/328 |
| 3,300,428 | 1/1967 | Schmidt | 260/42.22 |
| 3,332,055 | 7/1967 | Bogner | 260/42.22 |
| 3,379,560 | 4/1968 | Thanp | 428/40 |
| 3,389,105 | 6/1968 | Bolger | 260/42.22 |
| 3,475,213 | 10/1969 | Stow | 428/328 |
| 3,872,051 | 3/1975 | Tiedeman et al. | 260/37 M |
| 3,910,857 | 10/1975 | Phillips | 260/37 M |
| 3,988,494 | 10/1976 | McAdam | 428/328 |
| 4,097,445 | 6/1978 | Martins et al. | 260/37 M |

FOREIGN PATENT DOCUMENTS

| | | | |
|---|---|---|---|
| 687156 | 5/1964 | Canada | 428/328 |
| 2402928 | 2/1975 | Fed. Rep. of Germany | 260/37 M |
| 441083 | 1/1936 | United Kingdom . | |

Primary Examiner—Stanley S. Silverman
Attorney, Agent, or Firm—Richard P. Fennelly

[57] ABSTRACT

A pressure sensitive product with a decorative appearance is disclosed which comprises: (a) a substantially transparent plastic film; (b) a layer of pressure sensitive adhesive attached to the film, said layer containing non-leafing metallic flakes; and, (c) optionally, a release liner attached to the adhesive. Such a product is easily repositioned when first applied without substantial pressure to a desired substrate. After application of such pressure, the product exhibits superior adhesion as compared to a control product not containing the metallic flakes.

7 Claims, 1 Drawing Figure

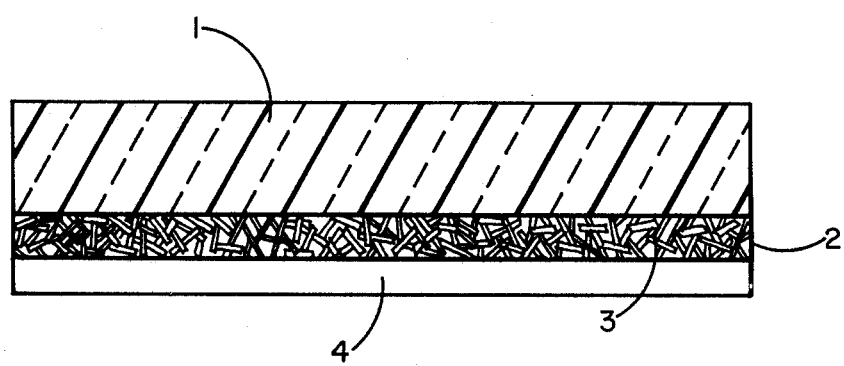
FIGURE

PRESSURE SENSITIVE PRODUCTS WITH DECORATIVE APPEARANCE

This is a division of application Ser. No. 816,736 filed July 18, 1977.

BACKGROUND OF THE INVENTION

1. Field of the Invention

The present invention is a pressure sensitive plastic film product with a decorative appearance which is useful, for example, as trim or a decorative marking on vehicles.

2. Description of the Prior Art

Pressure sensitive products with a decorative appearance, for example, a metallic or pigmented appearance, have been formed in the past using plastic films which are substantially transparent. In such products a thin coating which provides opacity and background color, sometimes referred to as a "blotch" coat, comprising ink and pigment has been juxaposed between one side of the film and a pressure sensitive adhesive/release liner subcombination. In these known products, the blotch coat was quite thin, and the amount of pigment was quite critical if the desired properties were to be obtained. Inclusion of too little pigment resulted in a product not having the desired degree of opacity for the intended decorative effect. If too much pigment was present, the desired degree of opacity was achieved but the cohesive strength of the blotch coat was severely diminished leading to delamination of the pressure sensitive product.

SUMMARY OF THE PRESENT INVENTION

The present invention is a pressure sensitive product having a decorative appearance which comprises: (a) a substantially transparent plastic film; (b) a layer of pressure sensitive adhesive attached to the film, said layer containing non-leafing metallic flakes; and (c) optionally, a release liner attached to the adhesive. Such a pressure sensitive product is surprisingly, easily repositionable when first applied without substantial pressure to a desired substrate. However, after pressure is applied to affix it to the substrate in a desired position, it ultimately exhibits superior adhesion as compared to a control product not containing the metallic flakes.

BRIEF DESCRIPTION OF THE DRAWING

The FIGURE which is attached hereto and which forms a part of the specification is an enlarged cross-sectional view of a pressure sensitive product made in accordance with the present invention.

DETAILED DESCRIPTION OF PREFERRED EMBODIMENTS

The pressure sensitive product of the present invention will be more fully understood by referring to the Drawing which forms a portion of this application. In the Drawing, a preferred embodiment of the present invention is shown in cross-section wherein a substantially transparent plastic film 1 has laminated to one of its sides, a layer of pressure sensitive adhesive 2 containing non-leafing metallic flakes 3. A release liner 4 preferably covers the side of the adhesive layer 3 which is opposite film 1 in order to protect the adhesive from contamination from dirt or other solid or liquid contaminants.

The plastic film 1 may be any conventional, substantially transparent and flexible film known to persons of ordinary skill in the art of fabricating decorative pressure sensitive products. The term "substantially transparent" as used herein is intended to encompass those plastic films which are transparent enough to allow a viewer to perceive the decorative effect generated by the metallic flakes 3 in the adhesive 2. The film thickness will generally range from about 2 mils (0.05 mm.) to about 20 mils (0.5 mm.), and the film can be a homo- or copolymer of vinyl chloride, the preferred film material, a polyester resin, a cellulose resin, or the like. Films of this type are well known to the art and have been used heretofore in forming decorative laminates which differ in construction from the present laminate.

The pressure sensitive adhesive 2 which is used in the present laminate may also be any of the pressure sensitive adhesives which are known and conventionally used in the art. As for the applicable tacky, pressure sensitive adhesives which may be utilized in the product of this invention, they may be based upon an elastomeric material such as: (1) natural rubber; (2) synthetic rubbers including, for example, styrene-butadiene copolymers, polyisobutylene, butadiene-acrylonitrile copolymers, polychloroprene, and polyisoprene; (3) acrylic copolymers containing at least 50 percent, by weight, of a $C_4$–$C_{12}$ alkyl acrylate ester, i.e., an alkyl acrylate ester wherein the alkyl group contains from 4 to 12 carbon atoms, together with a hardening comonomer, for example, vinyl acetate, styrene, methyl methacrylate, methyl acrylate, ethyl acrylate, ethyl methacrylate, and vinyl chloride; and (4) polymers of alkyl vinyl ethers such, for example, as polymethyl vinyl ether and polyethyl vinyl ether. Acrylic pressure sensitive adhesives are most preferred since they have the best balance of adhesive and cohesive properties for the present laminate. The thickness of the adhesive layer 2 will generally be in the range of from about 0.5 mil (0.013 mm.) to about 2.0 mils (0.05 mm.).

The pressure sensitive adhesive layer 2 contains an effective amount of non-leafing metallic flakes 3 to produce a desired decorative effect and to surprisingly increase the adhesion of the product after it has been applied with pressure to a desired substrate. These flakes 3 are homogeneously dispersed throughout the adhesive layer 2 by means of conventional mixing apparatus. The term "non-leafing metallic flakes" is well known in the art and such products can be formed by means well known to persons of ordinary skill in the art. For purposes of the present invention, non-leafing aluminum flakes are preferred, and the following description of its method of manufacture and properties will sufficiently apprise a person of ordinary skill in the art as to how this metallic component might be formed.

The aluminum flake which can be employed in the preparation of the laminate of the instant invention can be prepared in several ways. The most common means of obtaining aluminum flake is to atomize molten aluminum and subsequently grind it or hammer it in the presence of various lubricants. If the lubricant is a long chain saturated fatty acid, the prepared flake is not easily wetted by a resinous adhesive vehicle and tends to float to the surface subsequent to application, giving a more or less continuous layer of aluminum flakes. This phenomenon is called leafing. Such leafing flakes are not suitable for use in the laminate of the present invention. It is therefore desirable to remove the long chain fatty acid or to grind or hammer the atomized aluminum in the presence of other materials such as, for example, the short chain fatty acids. The flakes thus produced are more easily wetted by the resinous adhesive vehicle and tend to become randomly dispersed rather than to float and are therefore less likely to layer at the surface during the curing or drying of the adhesive.

The aluminum flake can, if desired, be subjected to various treatments which impart a gloss or polish thereto. These polished aluminum flakes may then be utilized when a highly reflective decorative effect is to be generated by the laminate of the present invention.

These non-leafing aluminum flake particles are plate-like in appearance but have a ragged edge which follows no geometrical design which may be observed as being peculiar to the flakes in general. The flatness or plate-like appearance of the flake is generally determined by the method by which the flakes were prepared. The hammered flakes tend to be more flat than the ball milled; however, both may be used with equally good results. For a more complete description of non-leafing aluminum flake and the methods of preparation, reference is made to Organic Coating Technology, Payne, vol. II, 1961.

The particle size of the flake should be predominantly from about 100 mesh to about 200 mesh. However, substantial amounts may be above 100 mesh and up to 60 mesh. A predominant number and preferably about 80 percent of the particles should be from about 200 to about 60 mesh. Excellent compositions may be made using flake having as much as 15 percent −325 mesh which aids suspension.

It is quite significant that at least the predominant amount of the aluminum flakes have a particle size in the range of from 200 to 60 mesh. As a substantial number of the particles approach a smaller size (−325 mesh) there are an insufficient number of larger planer surfaces provided in the adhesive to give the desired degree of opacity needed.

The aluminum flake particles are employed in amounts of at least about 5 percent by weight of the adhesive layer with a maximum of about 20 percent. Optimum effects have been obtained when amount of flake is present at about 12%, by weight of the adhesive. Use of too little flake will not give the desired decorative effects, whereas amounts higher than described above will weaken the adhesive/substrate bond. It is preferred that from about 10 percent to about 15 percent of the flake be used.

If desired, a tinting pigment may be added to the flake containing composition. Examples of such pigments which may preferably be used include phthalocyanine green, phthalocyanine blue, indanthrene yellow, burnt sienna, indo orange, phthalocyanine blue green tone, carbon black, phthalocyanine blue red shade, quinacridone red and hydrated iron oxide.

One suitable non-leafing aluminum flake product which is commercially available from Alcan Metal Powder, Inc. is known by the grade designation "Grade MD-3100".

If the laminate of the present invention is to be manufactured at one location and used at another location, a release liner 4 is preferably affixed to the side of the pressure sensitive layer 3 which is furthest removed from film 1. The release liner 4 may be any of the release liners known to persons of ordinary skill in the art of making pressure sensitive products including removable, water soluble protective coatings, and the like. One preferred liner material is silicone coated release paper having a thickness of from about 2.0 mils (0.05 mm.) to about 12 mils (0.3 mm.). Of course, if the film/adhesive composite is to be manufactured and applied to a desired substrate at the same manufacturing location, a release liner may not be needed.

The laminate of the present invention can be formed by any of the techniques used to form pressure sensitive films. In a preferred embodiment, when a release liner, such as release paper, is to be used, the adhesive formulation in solvent form containing the non-leafing metallic flakes is applied to the release liner and the adhesive/release liner composite is heated to dry the adhesive layer. This combination is then laminated to the plastic film to form the final product. In those few applications wherein the product is not intended to have a release liner, the adhesive/metallic flake composite can be cast onto the vinyl film, and the adhesive layer in the resulting laminate can be dried as needed.

The following Examples show certain preferred embodiments of the present invention:

EXAMPLE 1

This Example illustrates a procedure for forming a decorative pressure sensitive product in accordance with the present invention.

A transparent, plasticized polyvinyl chloride (PVC) film was heat laminated to itself on a lamination machine by passing two layers of such film over a series of hot drums in order to achieve a heat seal temperature of about 300° F. (149° C.). The PVC film was simultaneously embossed on one side with a brushed silk pattern at the lamination point. The film that resulted had a thickness of 8 mils (0.2 mm.).

An adhesive formulation was then prepared which comprised 100 gm. of a 30%, by weight, solids acrylic pressure sensitive adhesive polymer and 3 gm. of a non-leafing, finely divided aluminum flake. The adhesive that was used was a high molecular weight thermoplastic acrylic terpolymer available as "Durotak 80-1053" from National Starch and Chemical Corp. The aluminum flake that was used is commercially available from Alcan Metal Powder, Inc. as "Grade MD-3100".

The adhesive and aluminum flake were mixed together for from about 5 to about 10 min. at high speed to effectively disperse the aluminum flake particles. The adhesive/aluminum flake composition was then coated onto silicone coated release paper using a laboratory coating blade. Removal of the volatiles from this coated layer was accomplished by drying the layer for 2 minutes at 250° F. (121° C.) in an oven. The dried adhesive thickness was about 1.2 mils (0.03 mm.).

The resultant adhesive coated release paper was then laminated to the unembossed side of the transparent PVC film by passing both the film and release paper through a laboratory nip roller at sufficient pressure to insure intimate contact of the adhesive with the film. This PVC film/adhesive/release liner laminate was then conditioned for 16 hours at laboratory ambient conditions to allow the adhesive to form a strong bond to the film. The opacity and aesthetics of the laminate were judged to be satisfactory.

Peel adhesion of the product was then determined by bonding one inch (2.54 cm.) strips of the PVC/adhesive laminate (after removal of the release liner) to a stainless steel panel using the standard Pressure Sensitive Tape Council 4.5 pound (2.04 kg.) roller. Peel adhesion at 180° C. was then measured after a 24 hour wetout or "dwell" period on a Thwing-Albert type tester. The value achieved was about 7.5 pounds per linear inch (ppli) or about 1.34 kg. per linear cm. Virtually all of the adhesive remained on the film thereby demonstrating both high adhesive strength to the film and high cohesive strength, the former being of more importance when the product is to be used as a permanent decorative film on a desired substrate.

A Control laminate, lacking the aluminum flake, yielded a peel adhesion of only 5.5 ppli (0.98 kg./linear cm.).

One advantage of the aluminum flake containing laminate as compared to the control laminate was the greater ease of repositionability that it exhibited. The presence of the flake reduced the "quick grab" of the adhesive allowing for initial repositioning of the laminate.

EXAMPLE 2

In another experiment, two other leafing, rather than non-leafing, aluminum flakes ("Grade MD-2100" and "Grade MD-5100" from Alcan Metal Powder, Inc.) were tried in similar amounts but they produced poor adhesion of the adhesive to the vinyl film when tested as above after 20 min. and 24 hr. dwell times on the substrate. The results of all tests are set forth in the Table which follows. All values are given as force (either lbs. or kg.) per linear (abbreviated "l.") unit of measure (either in. or cm.):

Stainless Steel Adhesion

| No. | Metallic Flakes | 20 min. Dwell | 24 hr. Dwell |
| --- | --- | --- | --- |
| 1. | None (control) | 2 lbs. 6 oz./1. in. (0.43 kg./1. cm.) | 4 lbs. 10 oz./1. in. (0.82 kg./1. cm.) |
| 2. | Non-leafing[1] | 3 lbs. 4 oz./1. in. (0.58 kg./1. cm.) | 9 lbs./1. in. (1.61 kg./1. cm.) |
| 3. | Leafing[2] | 3 lbs. 4 oz./1. in. (0.58 kg./1. cm.) | 4 lbs. 8 oz./1. in. (0.8 kg./1. cm.) |
| 4. | Leafing[3] | 4 lbs. 10 oz./1. in. (0.8 kg./1. cm.) | 6 lbs./1. in. (1.07 kg./1. cm.) |

[1]"Grade MD-3100" from Alcan Metal Powder, Inc.
[2]"Grade MD-2100" from Alcan Metal Powder, Inc.
[3]"Grade MD-5100" from Alcan Metal Powder, Inc.

Each of the above samples had the following peel adhesions after one minute: No. 1—3.5 lbs./l. in. (0.63 kg./l. cm.); No. 2—1.3 lbs./l. in. (0.23 kg./l. cm.); No. 3—2.4 lbs./l. in. (0.43 kg./l. cm.); and No. 4—2.9 lbs./l. in. (0.52 kg./l. cm.). No. 2, the product of this invention, has the lowest initial tack but the highest adhesion after 24 hr. dwell times.

After 20 minutes, when the film/adhesive laminates were peeled back from the panel, product Nos. 1 and 2 showed no transfer of adhesive to the plate from the film whereas products Nos. 3 and 4 showed transfer of adhesive. After 24 hours, product No. 1 showed no transfer, product No. 2 showed cohesive failure of the adhesive as illustrated by adhesive remaining on both film and panel, and products Nos. 3 and 4 showed failure of the adhesive to the film as illustrated by most of the adhesive being left on the panel. In those end uses where the product is to be left permanently on the object, these observations are merely of interest as to how the internal strength of the adhesive (cohesive strength) and bond strength of adhesive to film and/or substrate (adhesive strength) are related. Adhesion strength would be unquestionably the most important property.

EXAMPLE 3

Approximately 2000 yards (1835 m.) of a 4 mil (0.01 mm.) transparent PVC film was heat laminated to itself and was simultaneously embossed on one side with a shallow brushed silk roll.

An adhesive formulation was prepared by mixing 300 gm. of the acrylic adhesive used in Example 1, 15 gm. of ethyl acetate, 15 gm. of toluene and 12 gm. of the non-leafing aluminum flake used in Example 1. The mixing was performed at high speed on a Cowles type dissolver until the flake was completely dispersed in the adhesive solution. The viscosity of the formulation after mixing was about 2000 cps. (Brookfield viscosity 25° C., No. 2 spindle 20 rpm.).

The adhesive formulation containing the aluminum flakes was then applied to 90 pound basis weight, bleached kraft, silicone coated release paper using a reverse roll coater. A streak-free, uniform coating of adhesive on the release paper was produced, and the adhesive coating was dried by passing the adhesive/release paper laminate through an oven at 140° F. (60° C.) for 40 seconds followed by passage through a second oven at 270° F. (132° C.) for 45 seconds.

This adhesive/release paper laminate was then laminated to the unembossed side of the transparent PVC film as described in Example 1.

The resulting product was then tested against a control product that did not contain aluminum flakes in the adhesive using the test procedures described in Example 1. The adhesion at 180° was measured on stainless steel and lacquered panels using the same test method as described in Example 1. The results are given below in pounds per linear inch and (in parenthesis) in kilograms per linear centimeter:

Stainless Steel Adhesion

| Film | 20 min. Dwell | | 24 hr. Dwell | |
| --- | --- | --- | --- | --- |
| Film of this Invention | 4.2 | (0.75) | 10.3 | (1.84) |
| Control | 3.4 | (0.61) | 6.6 | (1.18) |

The 20 min. dwell readings showed no adhesive transfer from the film to the substrate, whereas both 24 hour dwell readings showed slight transfer using the same units given above:

Lacquer Painted Panel Adhesion

| Film | 30 min. Dwell | | 24 hr. dwell | |
| --- | --- | --- | --- | --- |
| Film of this Invention | 5.6 | (1.0) | 11.4 | (2.04) |
| Control | 5.6 | (1.0) | 6.5 | (1.16) |

At 30 minutes no adhesive transfer was noted for the film of this invention as compared to slight transfer for the control film. After 24 hours on the panels, both films showed cohesive failure as evidenced by transfer of substantial amounts of adhesive to the panel.

The films were also tested to determine the resistance by the adhesive to shrinkage of the vinyl film. This was evaluated by bonding a 1 inch×10 inch (2.54 cm.×25.4 cm.) adhesive coated film cut in the direction of travel of the film in the laminator to an aluminum panel with a standard 4.5 pound roller. The ends of the film were scored with a razor blade and after a 2 hour wet out period at room temperature the assembly was placed in a 250° F. (121° C.) oven for 30 minutes. Growth of the razor cut was measured with a magnifier after the film was cooled to room temperature. The film of this invention had a mounted shrinkage of 1/64" (0.04 cm.), whereas the control film had a shrinkage of 2/64" (0.08 cm.)

EXAMPLE 4

This Example compares the adhesion of a film of the present invention (Film A) to that exhibited by the type of decorative film known to the prior art (Film B).

Film A was an 8 mil (0.2 mm.) transparent polyvinyl chloride film that had been prepared by laminating two 4 mil (0.1 mm.) films together followed by application of adhesive containing non-leafing aluminum flakes as described in Example 1.

Film B was a 7 mil (0.175 mm.) transparent polyvinyl chloride film made by laminating a 3 mil (0.075 mm.) transparent film to the vinyl side of a 4 mil (0.100 mm.) film that had previously been printed on one side with a silver ink for decorative purposes. The same adhesive used in making Film A was applied to the silver ink side of the 7 mil film without the presence of the aluminum flakes.

Both films were applied to lacquer painted stainless steel panels and the peel adhesion was measured after the two films had been subjected to various environmental conditions for various lengths of time. The procedure described in Example 1 was employed to mount the films and measure the peel adhesion. The Table that is given below sets forth the results that were obtained in pounds/linear inch and (in parenthesis) kg./linear centimeter:

| Condition | Time | Adhesion of Film A | B |
|---|---|---|---|
| Room Temperature | 72 hrs. | 10.5 (1.88) | 5.5 (0.98) |
| 158° F. (70° C.) | 7 days | 10.3 (1.84) | 6.5 (1.16) |
| 158° F. (70° C.) | 14 days | 9.5 (1.70) | 6.5 (1.16) |
| 158° F. (70° C.) | 30 days | 9.3 | 5.3 |

-continued

| Condition | Time | Adhesion of Film A | B |
|---|---|---|---|
| 100° F. (37.8° C.) 100% Relative Humidity | 7 days | (1.66) 10.5 (1.88) | (0.95) 6.8 (1.21) |

These data demonstrate the uniformly higher adhesion values for the film of the present invention as compared to the type of film known to the prior art.

The above Examples merely illustrate certain preferred embodiments of the present invention and should not be construed in a limiting sense. The scope of protection which is sought is set forth in the appended claims.

What is claimed:

1. In combination, a pressure sensitive adhesive with non-leafing metallic flakes having a predominant particle size of from 200 to 60 mesh homogeneously dispersed throughout said adhesive in an amount of from at least about 5% to about a maximum of about 20%, by weight of adhesive, to render a plastic film laminate containing a layer of said adhesive initially repositionable when applied to a substrate and to confer increased adhesion for said laminate after sufficient pressure is applied to the laminate to bond it to the substrate.

2. The combination of claim 1 wherein the metallic flakes are aluminum flakes.

3. The combination of claim 2 wherein the metallic flakes are present at from about 10 weight percent to about 15 weight percent of the adhesive.

4. The combination of claim 1 wherein the pressure sensitive adhesive is an acrylic pressure sensitive adhesive.

5. The combination of claim 1 wherein the metallic flakes are present at from about 10 weight percent to about 15 weight percent of the adhesive.

6. The combination of claim 1 wherein the adhesive is an acrylic pressure sensitive adhesive and the metallic flakes are aluminum.

7. The combination of claim 6 wherein the metallic flakes are present at from about 10 weight percent to about 15 weight percent of the adhesive.

* * * * *

UNITED STATES PATENT AND TRADEMARK OFFICE
CERTIFICATE OF CORRECTION

PATENT NO. : 4,248,762

DATED : February 3, 1981

INVENTOR(S) : Walter J. Hornibrook et al.

It is certified that error appears in the above-identified patent and that said Letters Patent are hereby corrected as shown below:

Col. 2, line 21, "an" after "upon" should read -- any --.

Signed and Sealed this

Twenty-fifth Day of August 1981

[SEAL]

Attest:

GERALD J. MOSSINGHOFF

Attesting Officer

Commissioner of Patents and Trademarks